United States Patent
Castano

(10) Patent No.: US 8,334,927 B2
(45) Date of Patent: Dec. 18, 2012

(54) TELEVISION OPERATIVE TO DOWNLOAD NEW FUNCTIONAL APPLICATIONS VIA AN EXTERNAL SOFTWARE MODULE AND TO EXECUTE THE SAME WITHOUT ADDITIONAL HARDWARE

(75) Inventor: Guillermo Castano, SBC Tijuana, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 781 days.

(21) Appl. No.: 12/379,335

(22) Filed: Feb. 19, 2009

(65) Prior Publication Data

US 2010/0208136 A1 Aug. 19, 2010

(51) Int. Cl.
H04N 5/44 (2011.01)
H04N 7/00 (2011.01)
H04N 11/00 (2006.01)
H04N 5/455 (2006.01)
H04N 7/173 (2011.01)
G06F 9/44 (2006.01)

(52) U.S. Cl. .......... 348/553; 348/552; 348/726; 725/91; 725/132; 717/168

(58) Field of Classification Search .......... None
See application file for complete search history.

(56) References Cited

U.S. PATENT DOCUMENTS 6,469,742 B1 10/2002 Trovato et al.
6,628,340 B1 * 9/2003 Graczyk et al. ............ 348/552
7,425,992 B2 * 9/2008 Feeler et al. ............... 348/553
2007/0261046 A1 * 11/2007 Miller ........................ 717/168
2007/0296873 A1 * 12/2007 Ironi et al. .................. 348/726
2008/0120658 A1 * 5/2008 Cubillo ........................ 725/91
2008/0148335 A1 * 6/2008 Dawson et al. ............. 725/132
2009/0031387 A1 * 1/2009 Boyden et al. ............. 725/132

OTHER PUBLICATIONS

Extended European Search Report issue Sep. 9, 2011 for corresponding European Application No. 10 15 3007.
"Philips TV Software Upgrade with USB Portable Memory", http://www.p4c.philips.com/files/5/51pp9200d_37/51pp9200d_37_fur_aen.pdf.
"Sony to Introduce IPTV (Codename: Callisto) (Junpiter Project)", http://digg.com/hardware/Sony_to_introduce_IPTV_Codename_Callisto_Jupiter_Project_not_on.

* cited by examiner

Primary Examiner — Jefferey Harold
Assistant Examiner — Sean Haiem
(74) Attorney, Agent, or Firm — Haverstock & Owens LLP

(57) ABSTRACT

A television includes a control section, an interface and an external software module. The control section includes a processor and an internal memory that is in communication with the processor. The internal memory stores original program instructions for use by the processor to operate the television in accordance with the original program instructions. The interface is accessible exteriorly of the television and is in communication with the control section. The external software module is connectable to the interface and stores additional application program instructions that are downloadable to the control section when the external software module is connected to the interface. The downloaded additional application program instructions enable the television to function in a manner differently than any of the original program instructions. A method for adding new application program instructions to a television is also described.

10 Claims, 4 Drawing Sheets

TELEVISION OPERATIVE TO DOWNLOAD NEW FUNCTIONAL APPLICATIONS VIA AN EXTERNAL SOFTWARE MODULE AND TO EXECUTE THE SAME WITHOUT ADDITIONAL HARDWARE

BACKGROUND OF THE INVENTION

1. Field of the Invention

This application relates generally to a television that can operate in accordance with new functional application software. More particularly, this application is directed to a television that can download new functional application software through a removable, externally-connected software module and can operate the new functional application software as a new television feature without the need to connect an additional hardware device or additional hardware devices to the television.

2. Description of the Related Art

From the early days of television and even through today, television stations broadcast television programs as analog signals and television sets receive the analog signals via television antennas and transduce the received analog signals into viewable, continuous moving pictures with audible sound such as voice synchronized to the moving pictures. As television technology progressed, accessory devices were developed that connected to the television set to enhance the functionality of the television set. For example, a video cassette recorder, commonly known as a VCR, could be purchased as a separate hardware device and connected to the television set in order to record viewer-selected broadcasted television programs.

As progress in the television technology continued, many modern television sets today include computer-like capabilities. These modern television sets include high performance microprocessors that run on a dedicated operating system such as Linux (which is an operating system originally created by Linus Torvalds with the assistance of developers around the world under the GNU General Public License and the source code of this operating system is freely available to anyone). Such computer capabilities enhance the functionality of the television set. For example, Yahoo (a registered trademark of Yahoo! Inc. of Sunnyvale, Calif.) Widgets can be downloaded from the Internet to television sets with computer-like capabilities for display thereon.

Additionally, television sets with computer-like capabilities usually have firmware stored in a non-volatile memory. From time to time, this firmware might require updating. A USB (universal serial bus) memory device stored with updated firmware can be inserted in a USB port on the television set so that the updated firmware can be downloaded to the non-volatile memory.

It would be beneficial to provide a television that can be enhanced in functionality without connecting additional, separate hardware devices to the television. It would also be advantageous to provide a television that can be connected to a removable external storage device containing television-enhancement software for downloading so that the television would have enhanced functionality without the need for connecting additional or separate hardware devices. The present invention provides these benefits and advantages.

SUMMARY OF THE INVENTION

In accordance with one embodiment of the present invention, a television includes a control section, an interface and an external software module. The control section includes a processor and an internal memory that is in communication with the processor. The internal memory stores original program instructions for use by the processor to operate the television in accordance with the original program instructions. The interface is accessible exteriorly of the television and is in communication with the control section. The external software module is connectable to the interface and stores additional application program instructions that are downloadable to the control section when the external software module is connected to the interface. The downloaded additional application program instructions enable the television to function in a manner differently than any of the original program instructions.

In accordance with one aspect of the present invention, the downloaded additional application program instructions enable the television to emulate a television-compatible hardware device such as a video/audio recorder, an audio amplifier, a slide show presentation device, a video game playing device or a widget.

In accordance with one aspect of the present invention, the processor is a high performance microprocessor that is operative to run on a Linux operating system.

In accordance with another aspect of the present invention, the external software module stores a memory file system containing loader scripts and the internal memory stores scanning program instructions for scanning the memory file system of the external software module for the loader scripts when the external software module is connected to the interface such that, when the loader scripts are located, the loader scripts are used to add the additional application program instructions to the control section.

In accordance with yet another aspect of the present invention, the internal memory is one of random access memory, dynamic random access memory and flash memory, the interface is one of a high definition multimedia interface (HDMI), a universal serial bus (USB) port and IEEE 1394 and the external software module is one of a hard disk drive, a ram disk, flash memory and a zip drive.

In accordance with another embodiment of the present invention, a method for adding new application program instructions to a television includes the steps of:

providing the television that has a control section capable of detecting the presence of an external software module when the external software module is connected to the television;

detecting the presence of the external software module having a memory file system containing loader scripts;

scanning the memory file system of the external software module for the loader scripts and the new application program instructions; and downloading the loader scripts and the new application program instructions into the control section of the television so that the television is operable to run the new application program instructions.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

Figure 1:
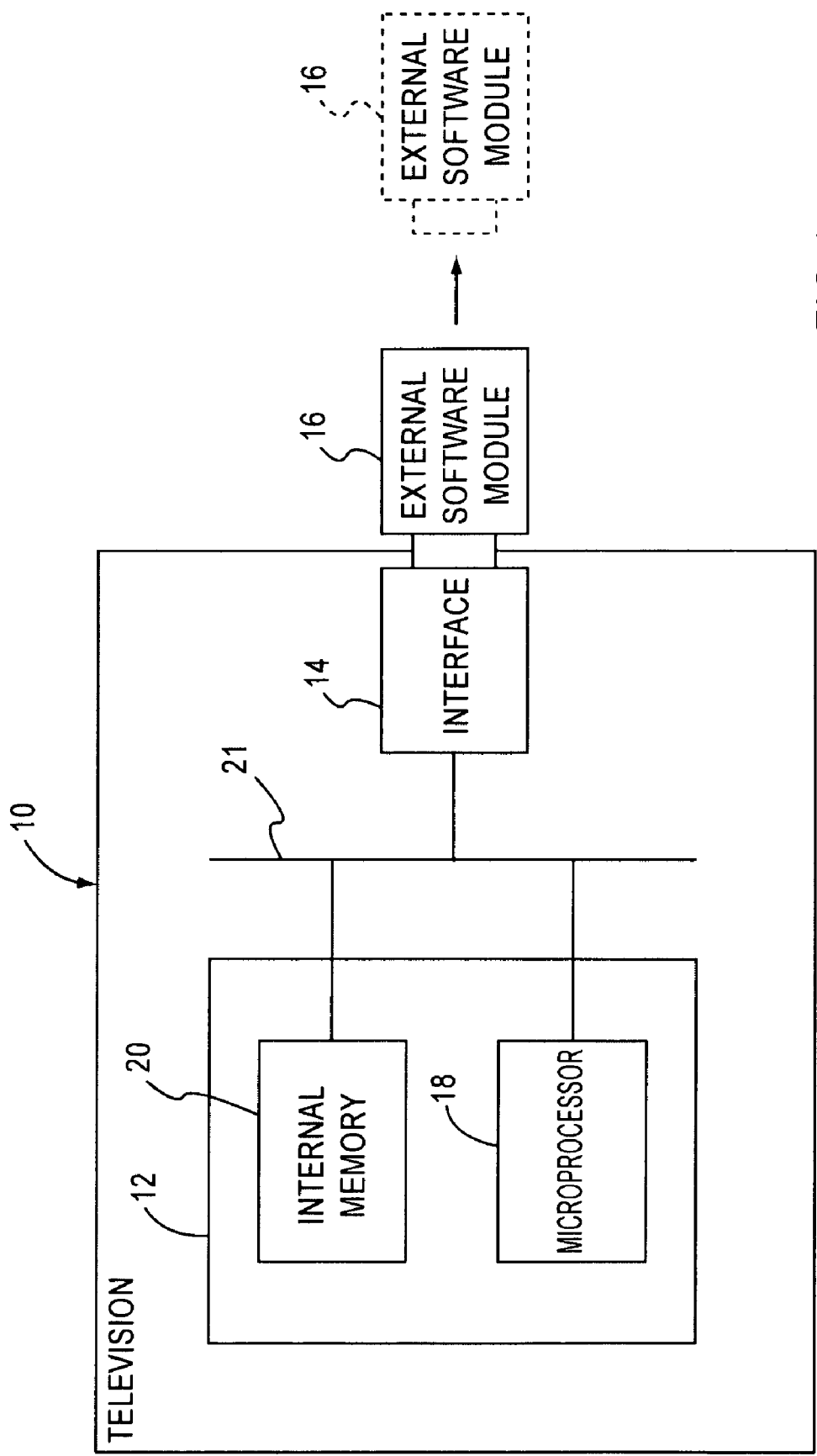
FIG. 1 is diagrammatical view of a first embodiment of a television of the present invention showing an external software module directly and removably connected to the television.
Figure 2:
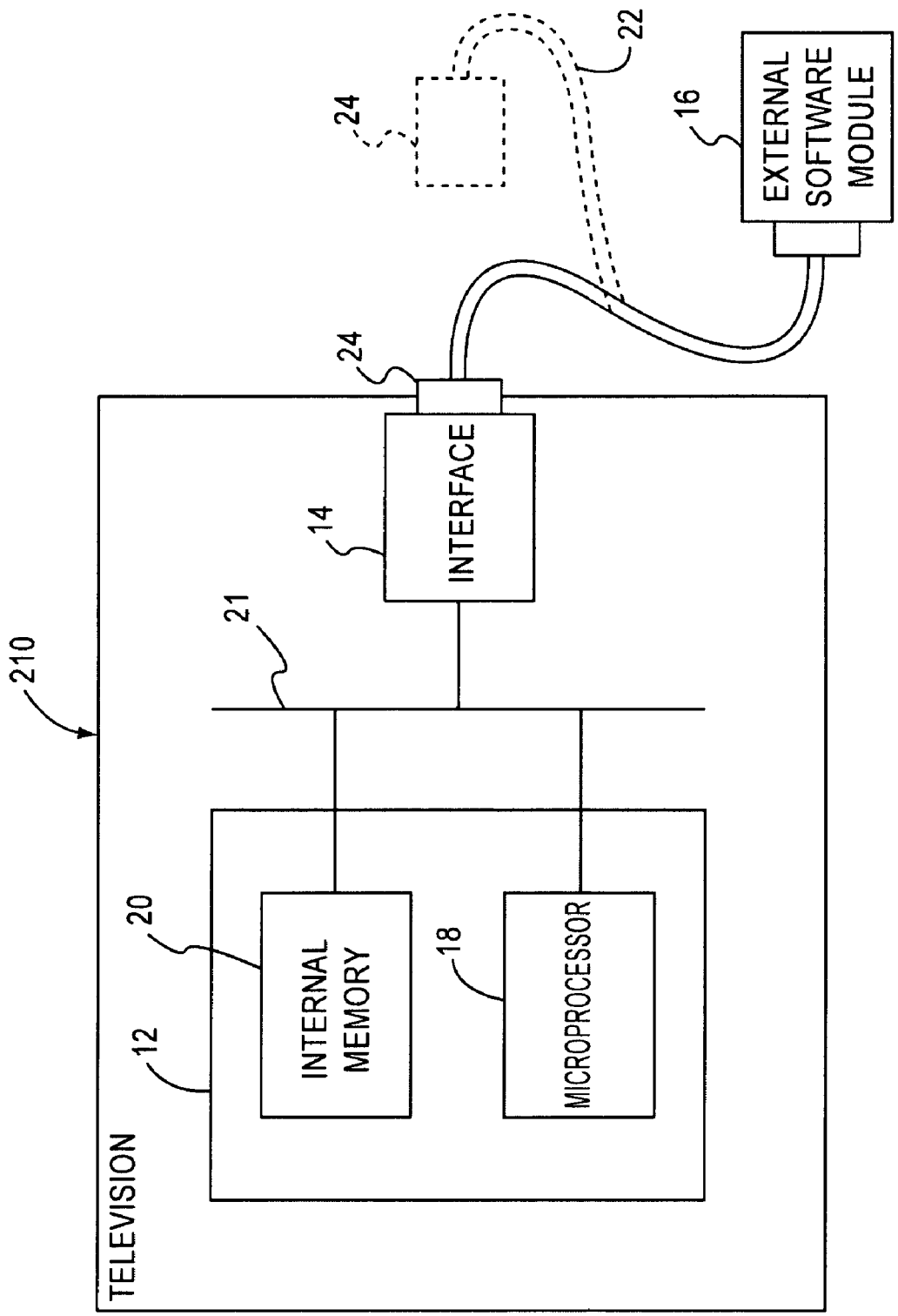
FIG. 2 is diagrammatical view of a second embodiment of a television of the present invention showing an external software module indirectly and removably connected to the television via a cable.
Figure 3:
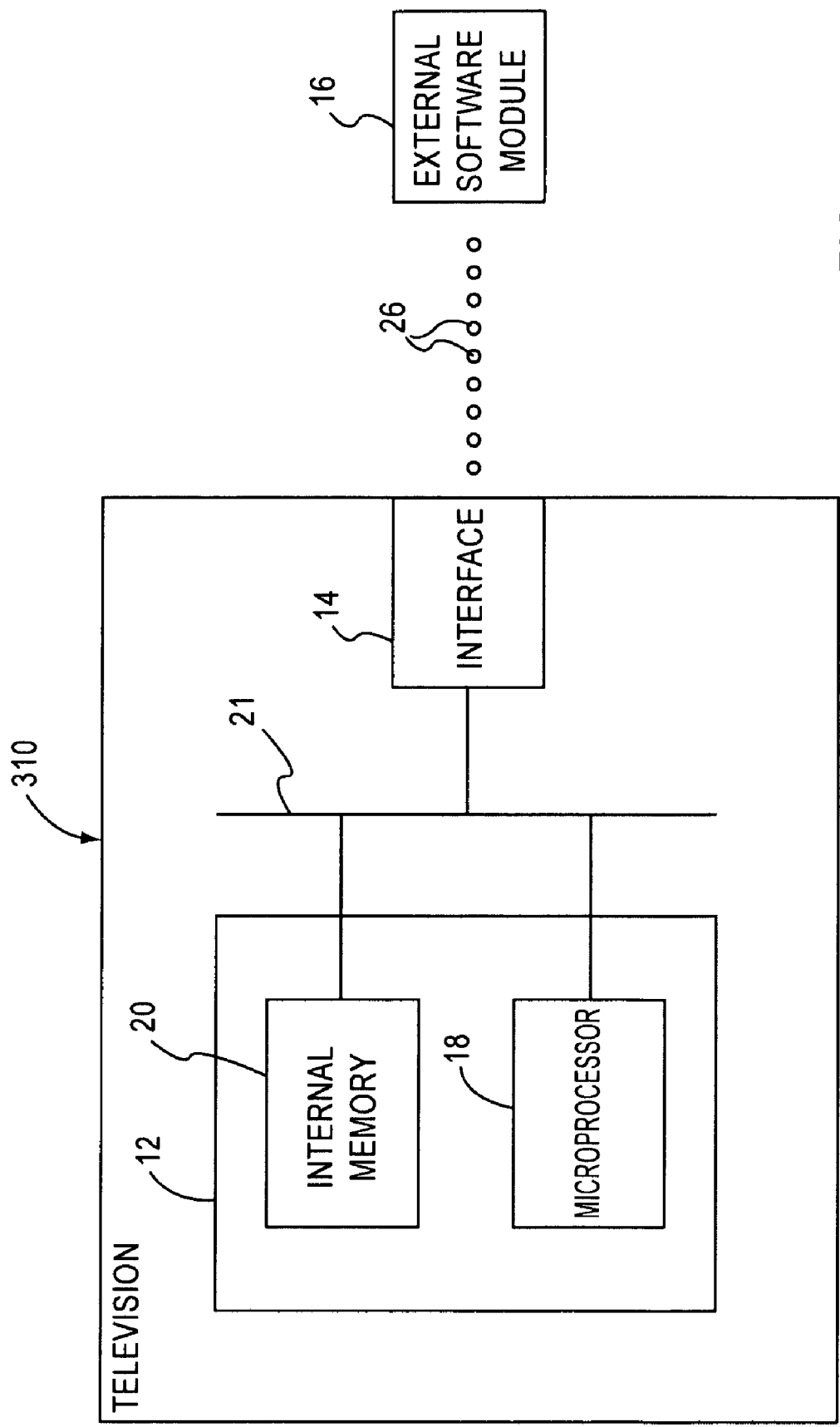
FIG. 3 is diagrammatical view of a third embodiment of a television of the present invention showing an external software module connected to the television in a wireless manner.

A television 10 of the present invention is generally introduced in FIGS. 1-3 and includes a control section 12, an interface 14 and an external software module 16. The control section 12 includes a processor 18 and an internal memory 20 that is in communication with the processor 18. As is commonly known in the art, the internal memory 20 stores original program instructions that are used by the processor 18 so that the processor 18 can operate the television 10 in accordance with the original program instructions. The interface 14 is accessible exteriorly of the television 10 and is in communication with the control section 12. The interface 14, the processor 18 and the internal memory 20 are in communication with each other through a conventional bus 21.

With reference to FIGS. 1-3, the external software module 16 is connectable to the interface 14 and stores additional application program instructions. The additional application program instructions are downloadable to the control section 12 when the external software module 16 is connected to the interface 14. The downloaded additional application program instructions enable the television 10 to function in a manner differently than any of the original program instructions.

As represented in FIG. 1, a first embodiment of the television 10 of the present invention illustrates the external software module 16 removably connected (drawn in solid lines) to the interface 14 of the television 10 and removed therefrom (drawn in phantom). Although not by way of limitation but by example only, the external software module 16 is depicted as a universal serial bus (USB) memory device such as a USB hard drive or a USB stick and, therefore, the interface 14 would be a universal serial bus (USB) receptacle. Furthermore, a skilled artisan would appreciate that the external software module 16 can also be a hard disk drive, a floppy disk drive device, a ram disk, a digital video device (DVD) drive, flash memory, a zip drive, a rotating optical storage device such as a compact disk drive (CD) and a digital video device (DVD) drive or any other type of external software storage device known in the art or hereinafter developed. Furthermore, it is preferred that the interface 14 be either a high definition multimedia interface (HDMI), the universal serial bus (USB) port or IEEE 1394.

In FIG. 2, a second embodiment of a television 210 of the present invention illustrates the external software module 16 removably connected to the television 210 by a conventional cable 22 with a conventional connector 24 that plugs into the interface 14 of the television 210. By way of example only, the conventional connector 24 might be a USB connector and, therefore, the interface 14 would be a compatible USB receptacle.

With regard to FIG. 3, a third embodiment of a television 310 of the present invention depicts the external software module 16 connectable to the television 310 in a wireless manner as illustrated by the line of dots 26 interconnecting the interface 14 and the external software module 16. By way of example only, the interface 14 and the external software module 16 can communicate with each other via conventional and compatible infra red communication devices, radio wave communication devices or any other wireless communication devices known in the art or hereinafter developed.

For simplicity of explanation, only the television 10 of present invention is hereinafter discussed although one skilled in the art would appreciate that the principles discussed hereafter apply to the television 210 and the television 310. The downloaded additional application program instructions enable the television 10 to emulate a television-compatible hardware device without any need for additional hardware. Although not by way of limitation but by example only, the television-compatible hardware device might be a video/audio recorder, a slide show presentation device, a video game player device or an audio amplifier. Thus, the downloaded additional application program instructions can enable the television 10 to function as video/audio recorder, a slide show presentation device, a video game player device or an audio amplifier without the need for installing a separate hardware device or devices that, in the past, have provided a television with these additional functions. Furthermore, by way of example only and not by way of limitation, the downloaded additional application program instructions might enable the television to operate a conventional widget without the television 10 having Internet capabilities.

A skilled artisan would appreciate that, for the video/audio recorder, once the external software module 16 is detected, the external software module 16 would populate the option menus with the capability to record the audio and video and thereafter play back the same at a later time. For the slide show presentation device, a slide show on the external software module 16 might be prepared as a Power Point (a registered trademark of Microsoft Corporation of Redmond, Wash.) presentation and, after being downloaded to the control section 12, the television 10 would automatically perform the slide show.

It is preferred that the processor 18 is a high performance microprocessor. Preferably, the high performance microprocessor is operative to run a Linux operating system. Furthermore, it is preferred that the external software module 16 stores a memory file system. Preferably, the external software module 16 contains loader scripts. It is further preferred that the internal memory 20 stores scanning program instructions. These scanning program instructions scan the memory file system of the external software module 16 for the loader scripts when the external software module 16 is connected to the interface 14. As is known in the art, when the loader scripts are located by the control section 12, the loader scripts are used to add the additional application program instructions to the control section 12.

One of ordinary skill in the art would appreciate that the internal memory 20 is random access memory. Such random access memory might be dynamic random access memory, static random access memory or flash memory.

Other components of the televisions 10, 210 and 310 such as a tuner, a display screen and the like are well known in the art and are not shown here in order to focus upon the aspects of the present invention. Therefore, no further discussion of these well-know television components are deemed necessary for explanation and understanding of the present invention.

Figure 4:
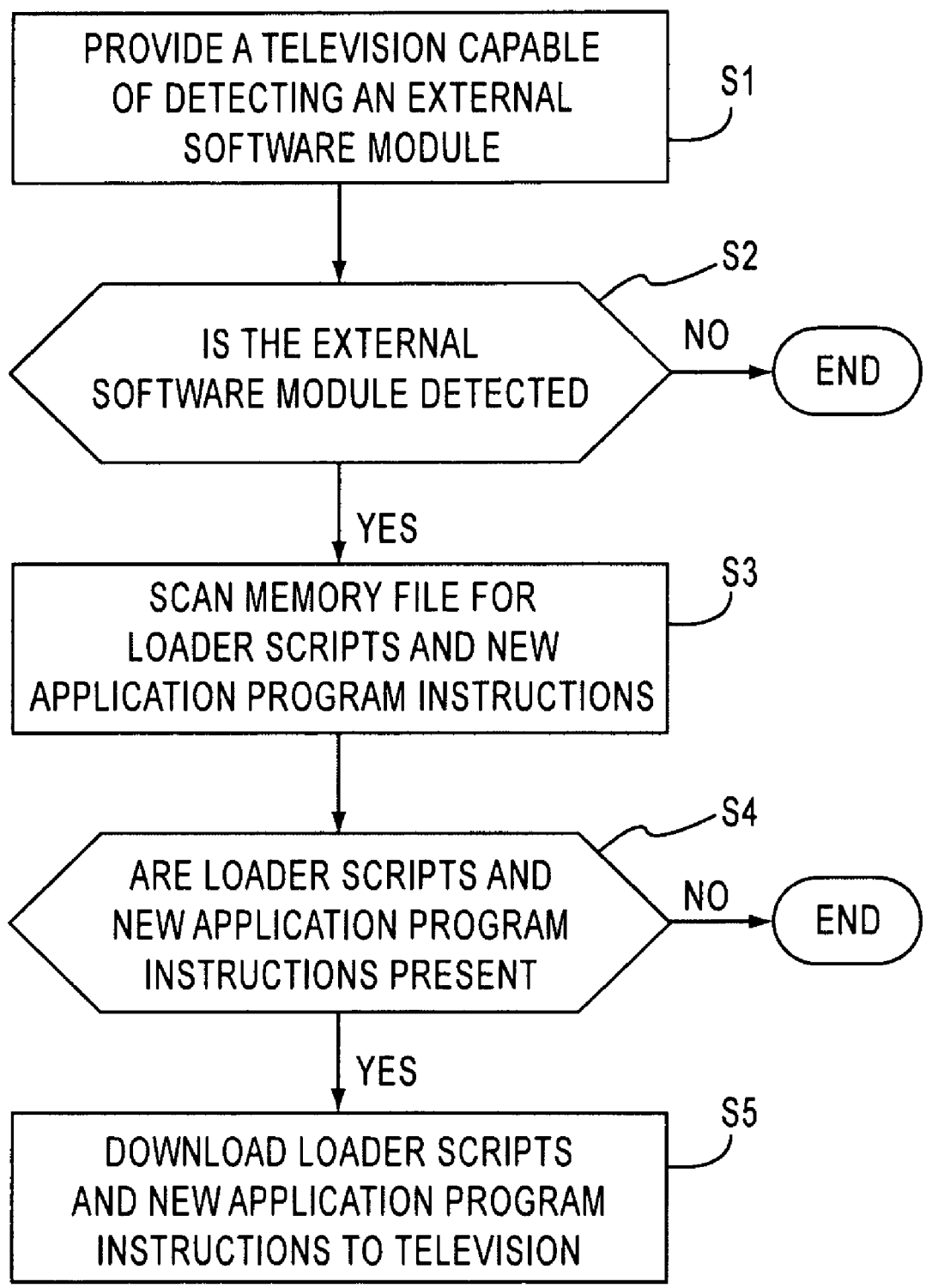
FIG. 4 is a flow chart of a method of the present invention for adding new application program instructions to the television.

Another embodiment of the present invention is a method for adding new application program instructions to a television and is discussed with reference to FIG. 4. Step S1 provides the television 10 that has the control section 12 capable of detecting the presence of the external software module 16 when the external software module 16 is connected to the television 10. Step S2 determines whether the external software module 16 is detected. If not, the method ends. If the external software module 16 is detected in Step S3, the method proceeds to Step S3. In Step S3, the memory file of the external software module 16 is scanned for loader scripts and new application program instructions. In Step S4, it is determined whether the loader scripts and the new application program instructions are present on the external software module 16. If not, the method ends. If it is determined that the loader scripts and the new application program instructions are present on the external software module 16, Step S5 downloads the loader scripts and the new application program instructions to the television 10 so that the television 10 is now operable, when desired by a viewer, to run the new application program instructions.

Although the present invention has been described in considerable detail with reference to certain embodiments thereof, other embodiments are possible. Other embodiments will become apparent to the ordinarily skilled artisan once instructed according to the present invention. Therefore, the spirit and scope of the appended claims should not be limited to the description of the embodiments contained herein.

What is claimed is:

1. A television, comprising:
    a control section including a processor and an internal memory in communication with the processor, the internal memory storing original program instructions for use by the processor to operate the television in accordance with the original program instructions;
    an interface accessible exteriorly of the television and in communication with the control section; and
    an external software module connectable to and disconnectable from the interface such that, when the software module is connected to the interface, additional application program instructions are downloaded to the control section and, after the additional application program instructions are downloaded to the control section and the external software module is disconnected from the interface, the downloaded additional application program instructions enable the television to function in a manner differently than any of the original program instructions,
    wherein the downloaded additional application program instructions enable the television to emulate a television-compatible hardware device,
    wherein the downloaded additional application program instructions enable the television to operate a widget,
    wherein the external software module stores a memory file system containing loader scripts and
    wherein the internal memory stores scanning program instructions for scanning the memory file system of the external software module for the loader scripts when the external software module is connected to the interface.

2. A television according to claim 1, wherein the television-compatible hardware device includes at least one of a video/audio recorder and an audio amplifier.

3. A television according to claim 1, wherein the downloaded additional application program instructions enable the television to function as a slide show presentation device.

4. A television according to claim 1, wherein the downloaded additional application program instructions enable the television to function as a video game playing device.

5. A television according to claim 1, wherein the processor is a high performance microprocessor.

6. A television according to claim 5, wherein the high performance microprocessor is operative to run a Linux operating system.

7. A television according to claim 6, wherein, when the loader scripts are located, the loader scripts are used to add the additional application program instructions to the control section.

8. A television according to claim 1, wherein the internal memory includes one of random access memory, dynamic random access memory and flash memory.

9. A television according to claim 1, wherein the interface includes one of a high definition multimedia interface (HDMI), a universal serial bus (USB) port and IEEE 1394.

10. A television according to claim 1, wherein the external software module includes one of a hard disk drive, a ram disk, flash memory and a zip drive.

* * * * *